(12) United States Patent
Eriksen

(10) Patent No.: US 8,607,640 B2
(45) Date of Patent: Dec. 17, 2013

(54) SENSOR FOR MEASURING LARGE MECHANICAL STRAINS IN SHEAR OR LATERAL TRANSLATION

(76) Inventor: Odd Harald Steen Eriksen, Minneapolis, MN (US)

( * ) Notice: Subject to any disclaimer, the term of this patent is extended or adjusted under 35 U.S.C. 154(b) by 667 days.

(21) Appl. No.: 12/839,061

(22) Filed: Jul. 19, 2010

(65) Prior Publication Data

US 2012/0012699 A1   Jan. 19, 2012

(51) Int. Cl.
*G01B 7/16* (2006.01)
*G01L 1/00* (2006.01)

(52) U.S. Cl.
USPC ........................................ 73/780; 244/100 R

(58) Field of Classification Search
USPC ................... 244/100 R; 73/729.1, 718, 780
See application file for complete search history.

(56) References Cited

U.S. PATENT DOCUMENTS

| | | | |
|---|---|---|---|
| 2,968,031 A | 1/1961 | Higa | |
| 3,109,984 A * | 11/1963 | Mehr | 323/365 |
| 3,280,628 A * | 10/1966 | Schloss | 73/301 |
| 3,433,064 A * | 3/1969 | Jacobson | 73/862.382 |
| 3,471,758 A * | 10/1969 | Werner | 361/280 |
| 3,729,985 A * | 5/1973 | Sikorra | 73/780 |
| 3,783,496 A | 1/1974 | Siler | |
| 4,269,070 A * | 5/1981 | Nelson et al. | 73/779 |
| 4,312,042 A | 1/1982 | Bateman | |
| 4,386,533 A * | 6/1983 | Jackson et al. | 73/862.626 |
| 4,422,341 A * | 12/1983 | Espiritu Santo et al. | 73/862.626 |
| 4,445,386 A * | 5/1984 | Nielsen | 73/780 |
| 4,480,480 A | 11/1984 | Scott et al. | |
| 4,510,814 A * | 4/1985 | Espiritu Santo et al. | 73/862.57 |
| 4,651,402 A | 3/1987 | Bonfils | |
| 4,850,552 A | 7/1989 | Darden et al. | |
| 4,944,181 A * | 7/1990 | Wnuk | 73/780 |
| 5,010,775 A * | 4/1991 | Choisnet | 73/862.337 |
| 5,086,651 A * | 2/1992 | Westermo et al. | 73/763 |

(Continued)

FOREIGN PATENT DOCUMENTS

| | | |
|---|---|---|
| DE | 3239877 A1 | 5/1984 |
| DE | 4035197 A1 | 1/1992 |

(Continued)

OTHER PUBLICATIONS

European Search Report dated Nov. 2, 2011 for European Patent Application No. EP 11250647.2.

(Continued)

*Primary Examiner* — Joseph W Sanderson
*Assistant Examiner* — Valentina Xavier
(74) *Attorney, Agent, or Firm* — Snell & Wilmer L.L.P.

(57) ABSTRACT

A capacitive strain sensor for sensing strain of a structure. The sensor includes a first section attached to the structure at a first location and a second section attached to the structure at a second location. The first section includes a capacitor plate electrically isolated from the structure and the second section includes two electrically isolated capacitive plates, both of the plates being electrically isolated from the structure. A flexible connector connects the first section to the second section. The capacitor plate of the first section is separated from the two capacitive plates of the second section by at least one capacitive gap. When strain is experienced by the structure, a change occurs in the capacitive gap due to relative motion between the first and second sections. The first section includes a core and the second section includes a ring that receives the core.

20 Claims, 6 Drawing Sheets

(56) References Cited

U.S. PATENT DOCUMENTS

| | | | |
|---|---|---|---|
| 5,205,514 A | 4/1993 | Patzig et al. | |
| 5,289,435 A * | 2/1994 | Milner et al. | 367/181 |
| 5,314,115 A | 5/1994 | Moucessian | |
| 5,358,637 A | 10/1994 | Hutzler et al. | |
| 5,446,666 A | 8/1995 | Bauer | |
| 5,477,740 A | 12/1995 | Shioya et al. | |
| 5,518,206 A | 5/1996 | Arnold et al. | |
| 5,815,091 A | 9/1998 | Dames et al. | |
| 6,289,289 B1 | 9/2001 | Zweifel | |
| 6,334,588 B1 | 1/2002 | Porte | |
| 6,354,152 B1 | 3/2002 | Herlik | |
| 6,676,075 B2 | 1/2004 | Cowan et al. | |
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,959,497 B2 | 11/2005 | Leidinger | |
| 7,208,945 B2 | 4/2007 | Jones et al. | |
| 7,589,645 B2 | 9/2009 | Schmidt | |
| 7,680,630 B2 | 3/2010 | Schmidt | |
| 7,843,363 B2 | 11/2010 | Grichener et al. | |
| 8,359,932 B2 * | 1/2013 | Eriksen et al. | 73/856 |
| 2002/0043112 A1 * | 4/2002 | Schwarz et al. | 73/780 |
| 2002/0199131 A1 | 12/2002 | Kocin | |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0225474 A1 | 11/2004 | Goldfine et al. | |
| 2005/0030010 A1 | 2/2005 | Jones et al. | |
| 2005/0162389 A1 * | 7/2005 | Obermeyer et al. | 345/161 |
| 2006/0004499 A1 | 1/2006 | Trego et al. | |
| 2006/0038410 A1 | 2/2006 | Pratt et al. | |
| 2007/0006662 A1 * | 1/2007 | Giazotto | 73/800 |
| 2009/0173823 A1 | 7/2009 | Shetzer | |
| 2012/0011946 A1 | 1/2012 | Eriksen et al. | |
| 2012/0012700 A1 * | 1/2012 | Eriksen et al. | 244/100 R |
| 2012/0012701 A1 * | 1/2012 | Eriksen et al. | 244/100 R |
| 2012/0043417 A1 * | 2/2012 | Eriksen et al. | 244/100 R |
| 2012/0053784 A1 | 3/2012 | Schmidt et al. | |

FOREIGN PATENT DOCUMENTS

| | | |
|---|---|---|
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 8, 2012 in connection with EP Application No. 11250852.8.

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

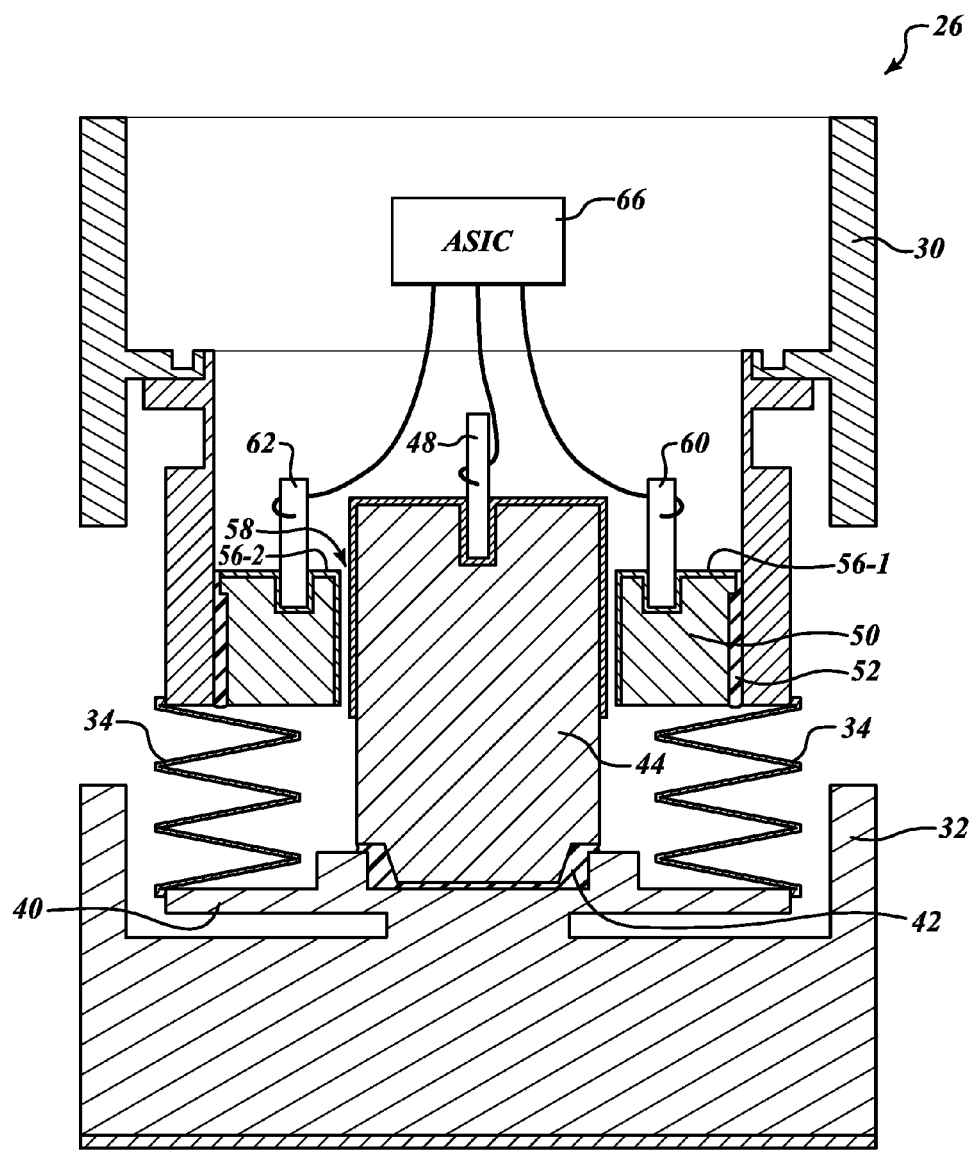
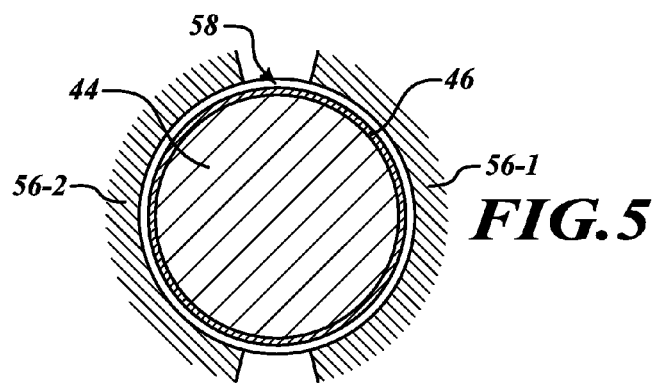
FIG.4
FIG.5

SENSOR FOR MEASURING LARGE MECHANICAL STRAINS IN SHEAR OR LATERAL TRANSLATION

COPENDING APPLICATIONS

U.S. patent application Ser. Nos. 12/839,401 and 12/839,170, filed Jul. 19, 2010, which are hereby incorporated by reference.

BACKGROUND OF THE INVENTION

Aircraft landing gear, amongst other support devices, can experience strains that might lead to catastrophic failure. During landing, a landing gear strut can be deformed due to strain in different directions. Subjective determination of when landing gear should be inspected or replaced may be over- or under-reported, leading to unnecessary inspections or a missed opportunity to inspect.

Strain is defined as the amount of deformation per unit length of an object when a load is applied. Strain is calculated by dividing the total deformation of the original length by the original length (L):

$$\text{Strain}(e) = (\Delta L)/L$$

For a polysilicon piezoresistive type of element, the resistance is changed with load applied. When a strain is introduced, the strain sensitivity, which is also called the gauge factor (GF), is given by:

$$GF = \frac{\frac{\Delta R}{R}}{\frac{\Delta L}{L}} = \frac{\frac{\Delta R}{R}}{\text{Strain}}$$

The most popular strain gauges are metal foil elements on polyimide film. The ideal strain gauge would change resistance only due to the deformations of the surface to which the gauge is attached. However, in real applications, temperature, material properties, the adhesive that bonds the gauge to the surface, and the stability of the metal all affect the detected resistance. Besides, the sensing range of usual strain gauges is limited by maximum stress of the sensing element. For example, the maximum strain limitation of both types of strain gauge and for silicon strain gauges is 3,000 micro-strain. FIG. 1 shows fatigue limits on foil gauges. Even at 3,000 micro-strain they will start to shift at less than 10,000 cycles.

SUMMARY OF THE INVENTION

The present invention provides a capacitive strain sensor for sensing shear strain or lateral displacement of a structure. The sensor includes a first section attached to the structure at a first location and a second section attached to the structure at a second location. The first section includes a capacitor plate electrically isolated from the structure and the second section includes two electrically isolated capacitive plates, both of the plates being electrically isolated from the structure. A flexible connector connects the first section to the second section. The capacitor plate of the first section is separated from the two capacitive plates of the second section by respective gaps between the first section and the two individual capacitive plates. The gaps would preferably be equal i.e. the first section concentric with the second section. When strain is experienced by the structure, a change occurs in the capacitive gap due to relative motion between the first and second sections.

In another aspect of the invention, the capacitor plate of the first section includes a core that is at least partially covered with a metallic coating. The two capacitive plates of the second section include a ring having an inner diameter that is greater than an outer diameter of the core. The ring is at least partially covered with two metallic coatings.

In another aspect of the invention, the core and ring have dimensions along a longitudinal axis, wherein the dimension of the core is greater than the dimension of the ring.

In yet another aspect of the invention, the ring is centered at a longitudinal center of the sensor.

In a further aspect of the invention, the sensor includes a cavity located in at least one of the first or second sections, at least one circuit component located in the cavity, and electrical leads that connect the at least one circuit component to the capacitive plates.

BRIEF DESCRIPTION OF THE DRAWINGS

Preferred and alternative examples of the present invention are described in detail below with reference to the following drawings:

FIG. 4 is a cross-sectional view of the sensor of FIG. 3;

FIG. 5 is a horizontal cross-sectional view of the sensor shown in FIGS. 3 and 4; and FIGS. 6-1 through 7-3 illustrate various attachment mechanisms for attaching sensors to a device under test.

DETAILED DESCRIPTION OF THE PREFERRED EMBODIMENT

Figure 2:
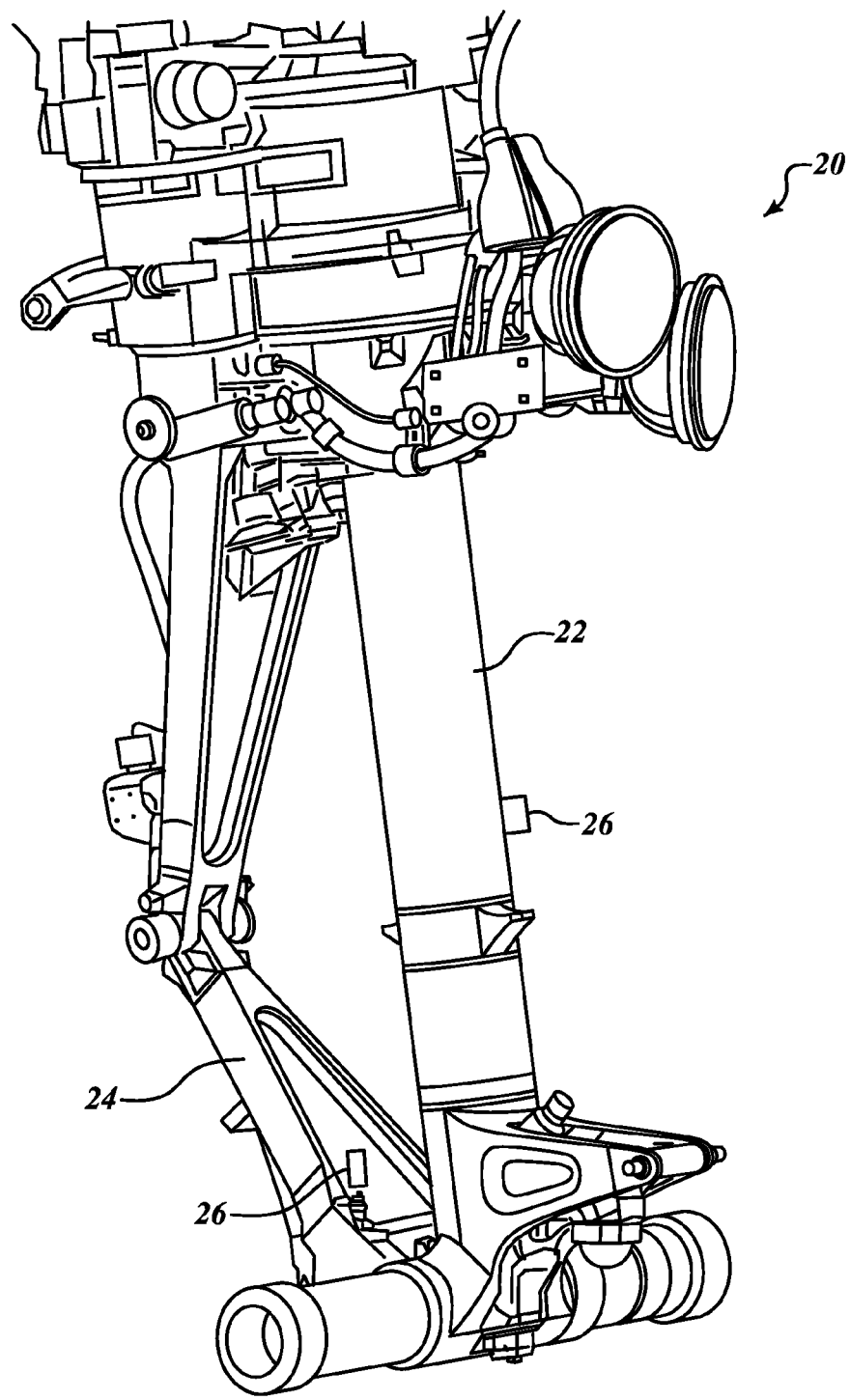
FIG. 2 is a perspective view of a landing gear assembly with sensors formed in accordance with the present invention.

The present invention provides a capacitance-based strain sensor 26 for measuring shear strains of a structure, such as aircraft landing gear 20 at a piston 22, torque linkage 24 or other location (see FIG. 2).

Figure 3:
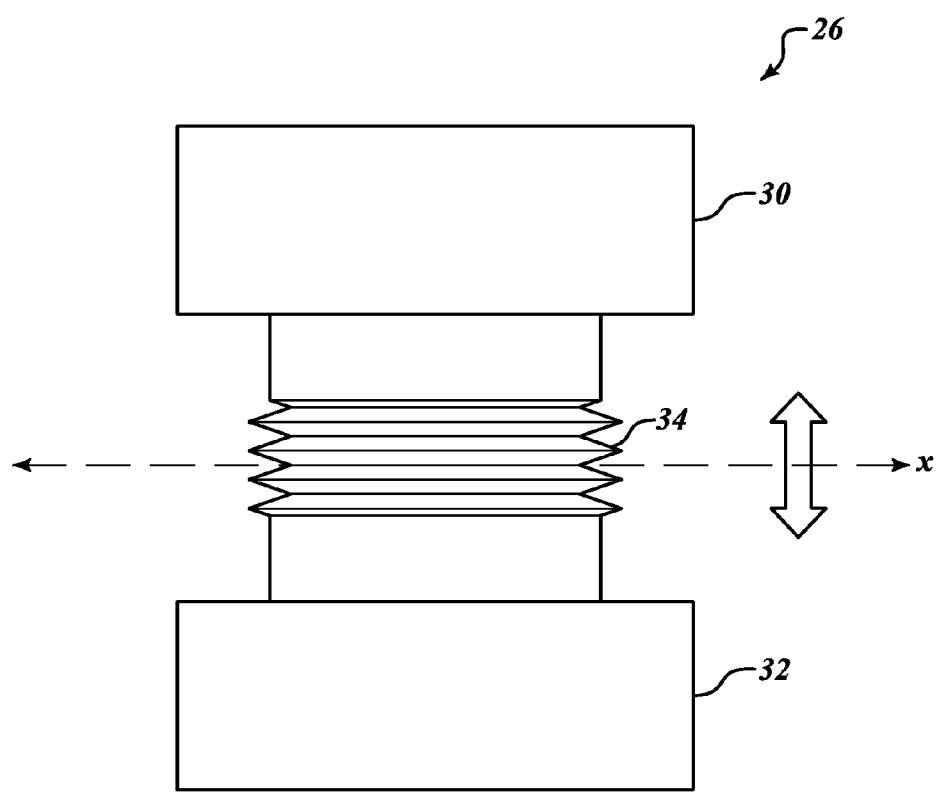
FIG. 3 is a side view of an exemplary sensor formed in accordance with the present invention.

As shown in FIG. 3, the sensor 26 is a capsule having upper and lower end caps 30, 32 that allow attachment to the structure where strains are to be measured. The strain from the structure is transferred to internal upper and lower segments where capacitive motion sensing occurs. The ends of end caps 30, 32 are connected (e.g., welded) to a metal bellows 34. The bellows 34 allow parallel movements (along X-axis) of the end caps 30, 32. The bellows 34 also allow deflection in the axial (Y-axis) direction as the upper and lower end caps 30, 32 move due to structure strain.

As shown in FIGS. 4 and 5, the sensor 26 includes three capacitive plates 46, 56-1, 56-2. The first capacitor plate 46 is attached to a solid core 44 that is attached (e.g., by an epoxy bead 42) to the lower end cap 32. Other attachment means may be used. The solid core 44 includes a continuous coating of metal on a top surface and around its circumference some distance from the top surface. A metal post 48 is attached to the solid core 44 at the top surface and is electrically connected to the metal coating.

The second and third capacitive plates 56-1, 56-2 are near half circles of a metal coating on a ring 50 which are continuous with near half circles of a metal coating extending across a top surface. The half circles of the inner diameter and the half circles on the top of the ring are disconnected electrically forming the two separate capacitor plates 56-1, 56-2 on the inner diameter and connecting metal film on the top surface. The metal half circles on the top surface end short of the outer perimeter of the ring 50 such that no electrical contact is permitted with the metal structure in which the ring 50 is mounted. The metalized ring 50 is attached to the upper end cap 30 with an epoxy bead 52. Other attachment means may be used. In one embodiment, the ring 50 is positioned with its center along a longitudinal axis (i.e., perpendicular to the x-axis) matching that of the sensor 26. Two metal posts 60, 62 are attached to the ring 50. One post 60 is positioned to electrically connect to the first plate 56-1 by mounting on the connected top surface. The other post 62 is positioned to electrically connect the second plate 56-2 by the same means on the respective top surface. The ring 50 is separated from the core 44 by a capacitive gap 58. The core 44 and the ring 50 are insulators (e.g., ceramic, glass, plastic or the like) before the metal coatings are applied. The metallization of the insulators (the core 44, ring 50) is performed by sputtering, thick film metallization, or comparable means well known in the art.

The upper cap 30 includes a cavity for receiving circuit components, such as an Application-Specific Integrated Circuit (ASIC) 66 or other circuit components. Other components included in the cavity may include a battery, a radio telemetry module (i.e., wireless transmitter), an antenna for wireless communications, or other comparable components. Electric leads connect the ASIC 66 or other components to the capacitive plates 46, 56-1, 56-2. The cavity in the upper end cap 30 is sealed from the environment by a cover (not shown), which is welded to the upper surface of the upper end cap 30.

Under shear caused by the structure, the core 44 moves closer to one capacitor plate 56-1 or 56-2 and farther from the opposing capacitor plate 56-2 or 56-1 respectively on the ring 50. The two capacitances from the capacitive plates on the ring 50 are read differentially by the installed or remote electronics. The solid core 44 is longer than the ring 50 (extends above and below) such that longitudinal axial movement effectively does not change the capacitance reading.

The ring 50 is mounted in the upper end cap 30 in such a manner that the lateral movement of the two end caps 30 and 32 provides relative motion of the capacitor plates in such a way that the solid core 44 moves toward one half metalized circle (56-1) and away from the other half metalized circle (56-2). For this reason, the half circles may be termed left and right as depicted in FIG. 5. In this orientation the attachment points of the end caps would be at either the 12 or 6 o'clock positions as depicted in FIG. 5. The motion of the solid core would then be left or right relative to the half circles.

The ring 50 and the solid core 44 are positioned such that the centroid of the capacitive field is at the mid point between the end caps 30, 32. Such mounting allows for relative rotation between the end caps. In this case, the change in spacing between films 58 and 56 due to rotation are balanced top and bottom minimizing errors due to such rotational displacement.

Figure 1:
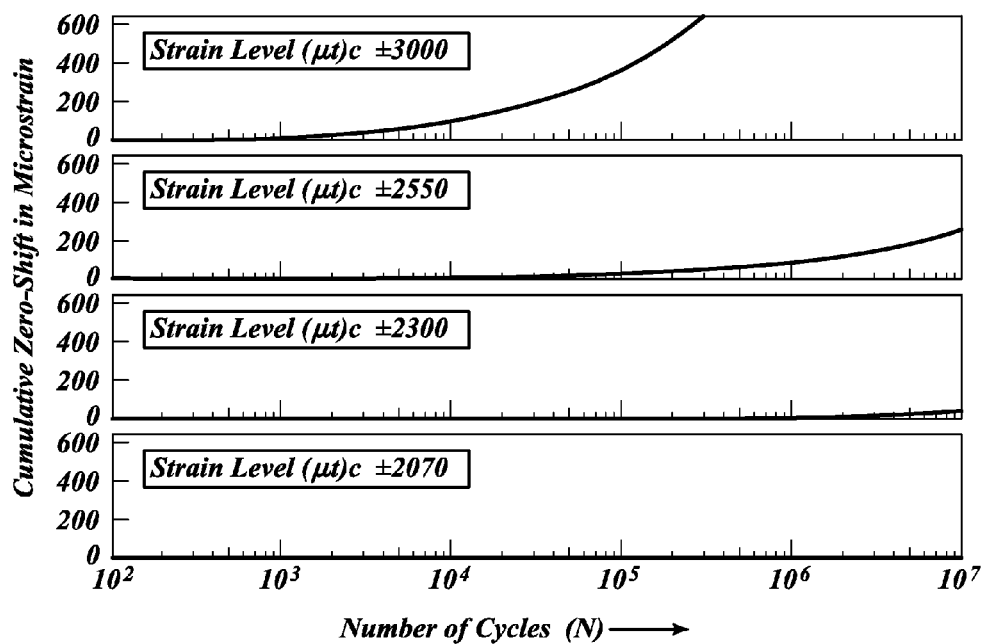
FIG. 1 is graph of prior art results.
Figures 1, 6:
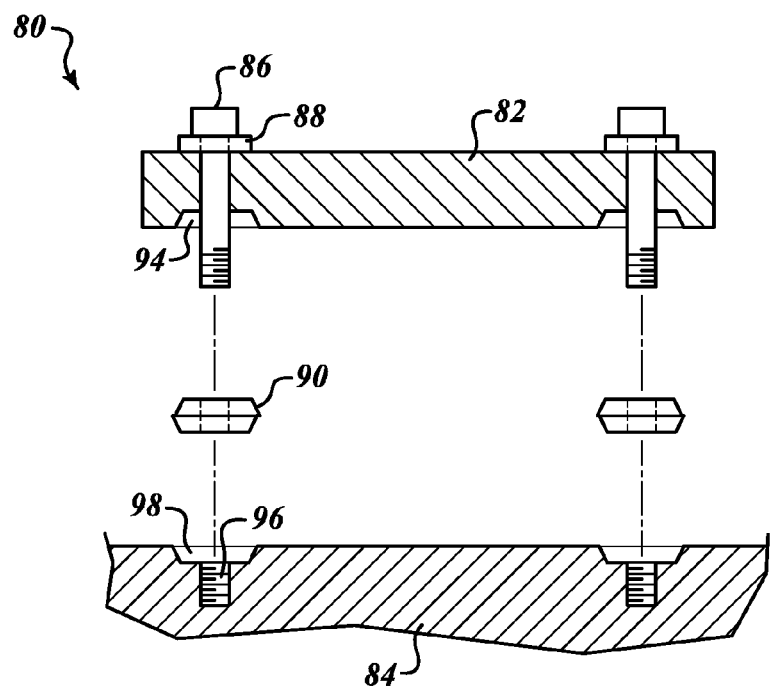
Figures 2, 6:
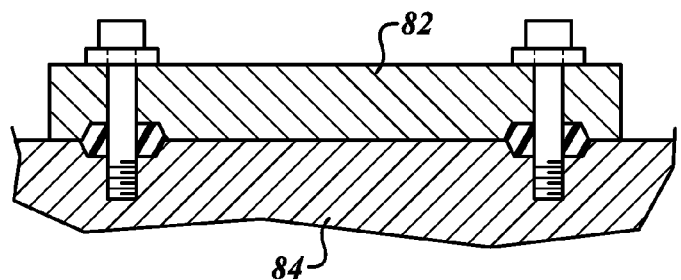

FIGS. 6-1 and 6-2 show one method for securing and aligning a strain sensor (not shown) to a structure 84 to be measured for strain. A mounting plate/flange 82 that is directly attached to or integral with one of the end caps includes two or more through-holes with a tapered section 94 at one end of each through-hole. The structure 84 includes two pin-receiving cavities 96, each having a tapered section 98 flush with the surface of the structure 84. The pin-receiving cavities 96 line up with the through-holes in the mounting plate/flange 82. A bolt/pin 86 is received through a washer 88, the through-hole, then through an eccentric tapered bushing 90 and finally a pin-receiving cavity 96. The tapered dowels 90 have an approximate 15° taper on both sides, matching the taper in the respective sections 94, 98. The two sides of each tapered dowel 90 are eccentric to each other, equivalent to the possible maximum mismatch in tolerances in machining the mating parts. When inserted in the receiving cavities 94 and 98, the bushing 90 can be rotated changing the effective center distance of the bushings relative to each other. As the adjusting bushing cams over due to the eccentricity to the two tapers, the receiving holes will settle on the new centers and be in perfect alignment with the bushings. Further, the eccentric tapers are slightly larger in diameter than the tapers in the receiving cavities. This oversized condition generates an effective press fit when the fasteners are torqued into place. One then has two dowel type bushings that are in perfect alignment as well as press fit into the receiving cavities providing a secure locking means to the structure 84. This secure locking means will transfer any motion perfectly to the mounted plate/flange.

Each of the dowels 86 has an Allen hex in the center. This allows rotation of the dowel during installation, providing for the self-centering of the system.

Figures 1, 7:
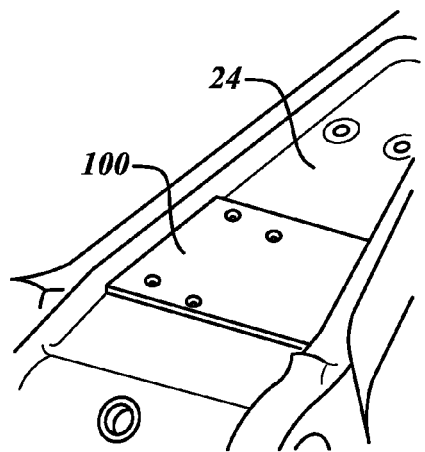
Figures 2, 7:
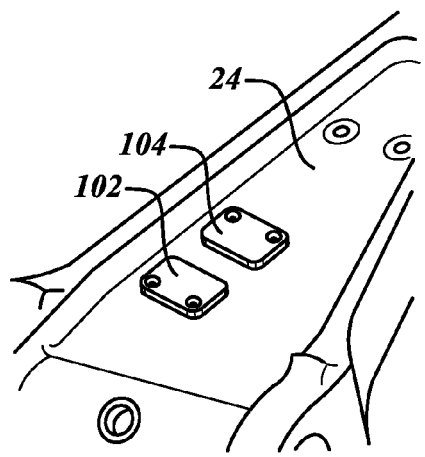
Figures 3, 7:
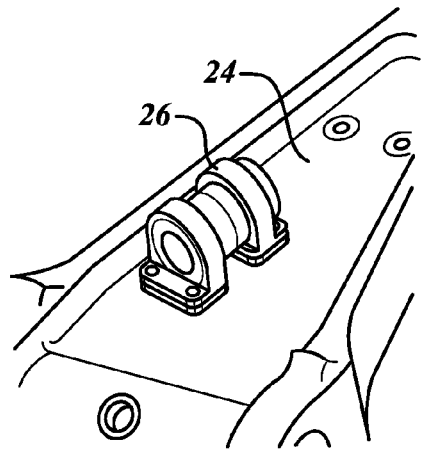

FIGS. 7-1 through 7-3 show bonded mounting pads 102, 104, used to position the sensor 26 onto a surface, such as the torque linkage 24. In the example shown, each end cap requires two bushings to maintain squareness of the two ends. In this case, at least one eccentric bushing is required to allow for center distance tolerance mismatch, as shown above. The eccentric bushings are inserted in the receiving cavities.

The two mounting pads 102 and 104 with tapered receiving holes are provided. The two mounting pads 102 and 104 are bonded to the torque link 24 or any substrate with an adhesive. To align the mounting pads relative to each other, first a single locating pad 100 is fastened to the mounting pads 102 and 104. This combined mounting pad assembly is brought into position on the torque linkage 24 or some other substrate. Then, an adhesive is applied between the mounting pads 102 and 104 and the torque link 24. Once the adhesive is cured, the locating pad 100 is removed and the mounting pads 102 and 104 are ready to receive the strain sensor. The mounting pads 102 and 104 allow the sensor 26 to be properly aligned with the torque link 24. As shown in FIG. 6-1, an exemplary locating pad 100 is trapezoid-shaped to fit in place within the geometry of the torque link 24 or may be aligned with any feature on any substrate. Bolts secure flanges of the upper and lower end caps 30, 32 to the surface through the machined holes via the mounting pad holes and tapered bushings (see FIG. 7-3).

In another embodiment, the sensor device may be side mounted on the strut piston as well or any surface where shear must be measured.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A capacitive strain sensor for sensing strain of a structure, the sensor comprising:
    a first section attached to the structure at a first location, the first section comprising a capacitor plate electrically isolated from the structure, wherein the first section is a core having an outer diameter, and wherein the capacitor plate is mounted to the core;

a second section attached to the structure at a second location, the second section comprising two electrically isolated capacitive plates, both of the plates being electrically isolated from the structure, wherein the second section is a ring having an inner diameter greater than the outer diameter of the core and the two electrically isolated capacitive plates are mounted to the ring; and a component configured to flexibly connect the first section to the second section, wherein the capacitor plate of the first section is separated from the two capacitive plates of the second section by at least one capacitive gap, and wherein the first section is axially movable relative to the second section.

2. The sensor of claim 1, further comprising a device configured to flexibly connect the first and second sections, wherein strain experienced by the structure causes a change in the at least one capacitive gap due to relative motion between the first and second sections.

3. The sensor of claim 2, wherein the device comprises at least one of pleated or convoluted expandable component.

4. The sensor of claim 3, wherein the first section, the second section, and the device provide a hermetic seal of at least one of the capacitive plates or the interior of the sensor.

5. The sensor of claim 3, wherein the device comprises at least two hinged metal annuli and the device is bonded by a weld to the first and second sections.

6. The sensor of claim 1, wherein the capacitor plate of the first section includes a metallic coating at least partially covering the core, wherein the two capacitive plates of the second section include two respective metallic coatings at least partially covering the ring.

7. The sensor of claim 6, further comprising:
a first structure attachment point connected to the first section; and
a second structure attachment point connected to the second section,
wherein the first and second attachment points are connected at approximately the same radial location on the first and second sections,
wherein the two metallic coatings on the ring are electrically isolated from each other and a first one of the two metallic coatings is located on a first half of the ring with an end near the attachment points and the second of the two metallic coatings is located on a second half of the ring with an end near the attachment points.

8. The sensor of claim 6, wherein the core and ring have dimensions along a longitudinal axis, wherein the dimension of the core is greater than the dimension of the ring.

9. The sensor of claim 6, wherein the ring is centered at a longitudinal center of the sensor.

10. The sensor of claim 1, further comprising:
a cavity located in at least one of the first or second sections;
at least one circuit component located in the cavity; and
electrical leads configured to connect the at least one circuit component to the capacitive plates.

11. The sensor of claim 1, further comprising a means for adjustably attaching the first and second sections to the structure.

12. The sensor of claim 11, wherein the means for adjustably attaching comprises one or more tapered eccentric dowels received by one of the first or second sections, cavities within the structure, and a tapered dowel received within at least one cavity within at least one of the first or second sections or the structure.

13. A landing gear assembly comprising:
a strut piston;
a torque linkage; and
a capacitive strain sensor for sensing strain of at least one of the strut piston or the torque linkage, the sensor comprising:
a first section attached to the at least one of the strut piston or the torque linkage at a first location, the first section comprising a capacitor plate electrically isolated from the at least one of the strut piston or the torque linkage, wherein the first section is a core having an outer diameter, and wherein the capacitor plate is mounted to the core;
a second section attached to the at least one of the strut piston or the torque linkage at a second location, the second section comprising two electrically isolated capacitive plates, both of the plates being electrically isolated from the at least one of the strut piston or the torque linkage, wherein the second section is a ring having an inner diameter greater than the outer diameter of the core and the two electrically isolated capacitive plates are mounted to the ring; and
a component configured to flexibly connect the first section to the second section, wherein the first section is axially movable relative to the second section, and
wherein the capacitor plate of the first section is separated from the two capacitive plates of the second section by at least one capacitive gap.

14. The landing gear assembly of claim 13, wherein the sensor further comprises a device configured to flexibly connect the first and second sections,
wherein strain experienced by the at least one of the strut piston or the torque linkage causes a change in the at least one capacitive gap due to relative motion between the first and second sections.

15. The landing gear assembly of claim 14, wherein the device comprises pleated expandable component, wherein the first section, the second section, and the device provide a hermetic seal of the capacitive plates.

16. The landing gear assembly of claim 15, wherein the device comprises at least two hinged metal annuli and the device is bonded by a weld to the first and second sections.

17. The sensor of claim 13, wherein the capacitor plate of the first section includes a metallic coating at least partially covering the core, wherein the two capacitive plates of the second section include two respective metallic coatings at least partially covering the ring.

18. The landing gear assembly of claim 17, wherein the sensor further comprises:
a first structure attachment point connected to the first section; and
a second structure attachment point connected to the second section,
wherein the first and second attachment points are connected at approximately the same radial location on the first and second sections,
wherein the two metallic coatings on the ring are electrically isolated from each other and the two metallic coatings are located on a half of the ring starting on opposite sides of the attachment points.

19. The landing gear assembly of claim 17, wherein the core and ring have dimensions along a longitudinal axis, wherein the dimension of the core is greater than the dimension of the ring, wherein the ring is centered at a longitudinal center of the sensor.

20. The landing gear assembly of claim 13, wherein the sensor further comprises a means for adjustably attaching the first and second sections to the at least one of the strut piston or the torque linkage.

* * * * *

UNITED STATES PATENT AND TRADEMARK OFFICE
CERTIFICATE OF CORRECTION

| | |
|---|---|
| PATENT NO. | : 8,607,640 B2 |
| APPLICATION NO. | : 12/839061 |
| DATED | : December 17, 2013 |
| INVENTOR(S) | : Odd Harald Steen Eriksen |

Page 1 of 1

It is certified that error appears in the above-identified patent and that said Letters Patent is hereby corrected as shown below:

In the Claims:

Column 6 Line 41, Claim 17, delete "sensor" and insert therefor --landing gear assembly--.

Signed and Sealed this
Fifteenth Day of April, 2014

Michelle K. Lee
*Deputy Director of the United States Patent and Trademark Office*